US008261185B2

(12) United States Patent
Riss et al.

(10) Patent No.: US 8,261,185 B2
(45) Date of Patent: Sep. 4, 2012

(54) CONSTRUCTING LINEAR REPRESENTATION OF A CONTENT BASED NETWORK

(75) Inventors: Uwe Riss, Karlsruhe (DE); Sylvia Scheu, Walldorf (DE)

(73) Assignee: SAP AG, Walldorf (DE)

( * ) Notice: Subject to any disclaimer, the term of this patent is extended or adjusted under 35 U.S.C. 154(b) by 449 days.

(21) Appl. No.: 12/475,617

(22) Filed: Jun. 1, 2009

(65) Prior Publication Data
US 2010/0306641 A1    Dec. 2, 2010

(51) Int. Cl.
*G06N 3/00* (2006.01)
(52) U.S. Cl. ....................................................... 715/234
(58) Field of Classification Search .................. 715/234, 715/243, 254, 255
See application file for complete search history.

(56) References Cited

U.S. PATENT DOCUMENTS

| 6,185,588 B1 * | 2/2001 | Olson-Williams et al. ... 715/236 |
| 6,507,410 B1 * | 1/2003 | Robertson et al. ........... 358/1.18 |
| 2009/0222737 A1 * | 9/2009 | Liesche et al. ................ 715/738 |

OTHER PUBLICATIONS

Fredrik Huitfeldt Madsen et al.; Calliope a Post-Structural Approach to Augmenting Documentation in Open-Source Projects; Department of Software and Media Technology, Aalborg University Esbjerg ; Baskin School of Engineering, University of California, Santa Cruz, Mar. 2005 (http://www.huitfeldt.com/repository/calliope.pdf).
Dave Raggett, Arnaud Le Hors, and Ian Jacobs; HTML 4.0 Specification; World Wide Web Consortium (W3C) Recommendation Dec. 18, 1997 (USA); (http://www.w3.org/TR/REC-html40-971218/html40.pdf).

* cited by examiner

*Primary Examiner* — Kyle Stork

(57) ABSTRACT

Described herein are systems and methods for constructing linear representations of content based networks. The methods comprise receiving a sub-network of a content based network comprising a plurality of fragments connected by one or more links, calculating fragment weight for at least some of the plurality of fragments, calculating link weight for at least one of the one or more links, creating a hierarchical structure from the sub-network, based on at least some of the calculated fragment weights and at least some of the calculated link weights, and converting the hierarchical structure to a linear representation. The linear representation may be augmented by additional overview information such as table of contents and index, which may be automatically generated.

19 Claims, 15 Drawing Sheets

CONSTRUCTING LINEAR REPRESENTATION OF A CONTENT BASED NETWORK

FIELD OF THE INVENTION

The field of the invention relates generally to software, and more particularly but not exclusively, to linearization of content based networks.

BACKGROUND OF THE INVENTION

Content based networks are one of the most popular information representations available on the web today. Based on a number of linked information fragments, the content based networks benefit from the simple concept of browsing by giving their users the opportunity to move forward into different directions according to their current needs. Unlike the classic document with a linear arrangement of content, the content based networks are more adapted to the associative way of human thinking. A typical example of a content based network is the information representation of the Wikipedia web site.

Although extremely useful for quick access to specific information, the content based networks are not suitable for thorough reading. For instance, majority of publications, presentations, and printed documents require linear text representation in order to consolidate and present the information. Thus, linearizing techniques are needed to present the information contained in fragments that make up content based networks as a document with a linear text representation, which may be more suitable for conventional reading.

SUMMARY OF THE INVENTION

Described herein are systems and methods for constructing linear representations of content based networks. According to one aspect, the methods comprise receiving a sub-network of a content based network comprising a plurality of fragments connected by one or more links, calculating fragment weight for at least some of the plurality of fragments, calculating link weight for at least one of the one or more links, creating a hierarchical structure from the sub-network, based on at least some of the calculated fragment weights and at least some of the calculated link weights, and converting the hierarchical structure to a linear representation. In yet another aspect, the linear representation may be augmented by additional overview information such as table of contents and index, which may be automatically generated.

BRIEF DESCRIPTION OF THE FIGURES

A better understanding of the present invention can be obtained from the following detailed description in conjunction with the following drawings, in which.

DETAILED DESCRIPTION

Embodiments of systems and methods for linearization of content based networks are described herein. In the following description, numerous specific details are set forth to provide a thorough understanding of embodiments of the invention. One skilled in the relevant art will recognize, however, that the invention can be practiced without one or more of the specific details, or with other suitable methods, components, materials, etc. In other instances, well-known structures, materials, or operations are not shown or described in detail to avoid obscuring aspects of the invention.

Reference throughout this specification to "one embodiment" or "this embodiment" means that a particular feature, structure, or characteristic described in connection with the embodiment is included in at least one embodiment of the present invention. Thus, the appearances of the phrases "in one embodiment" or "in this embodiment" in various places throughout this specification are not necessarily all referring to the same embodiment. Furthermore, the particular features, structures, or characteristics may be combined in any suitable manner in one or more embodiments.

Figure 1:
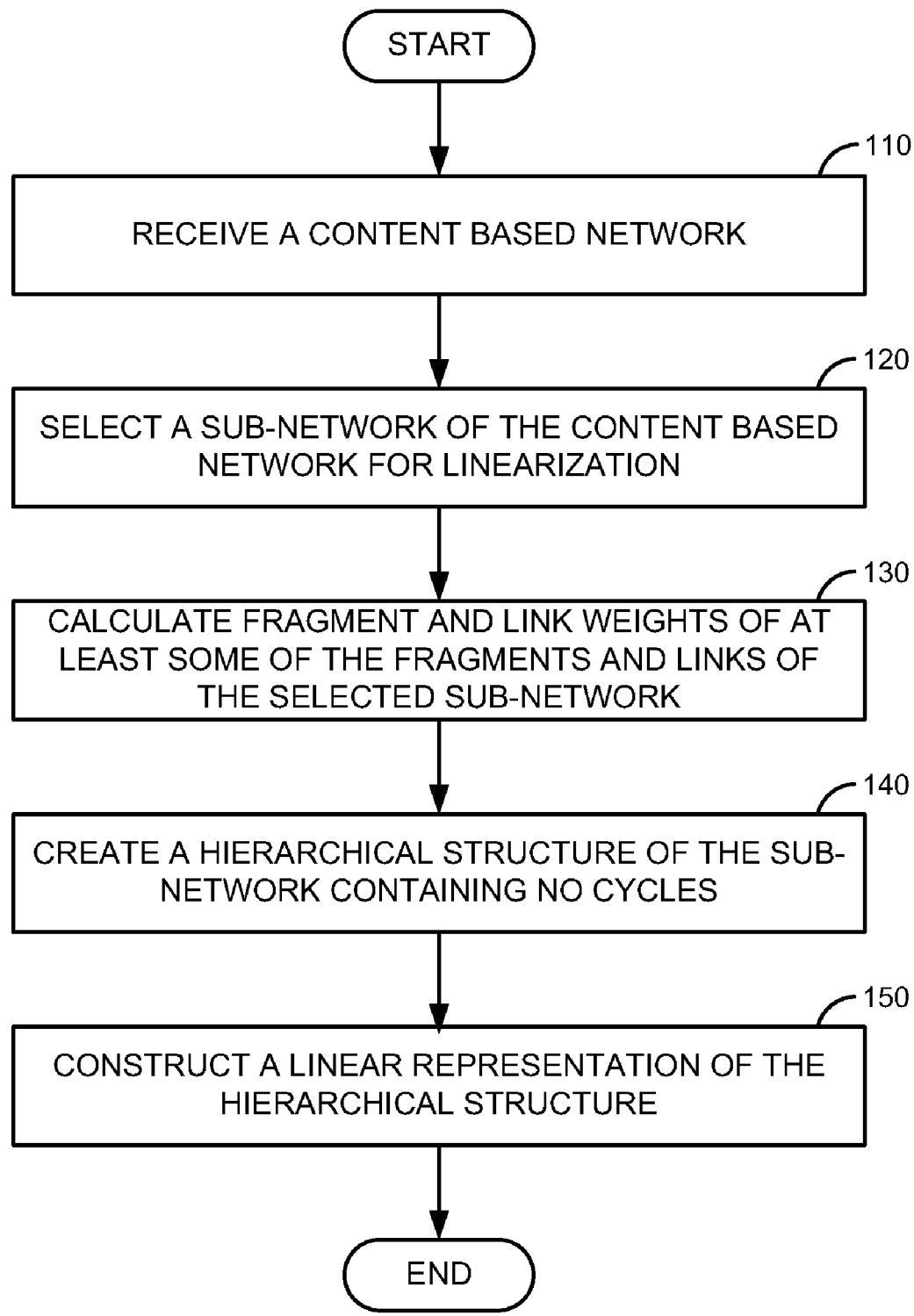
FIG. 1 is a flow diagram of an exemplary process for constructing linear representation of a content based network, in accordance with an embodiment of the present invention.

FIG. 1 is a flow diagram of an exemplary process for constructing linear representation of a content based network. At block 110, the process receives a content based network as an input. The content based network typically consists of information fragments semantically connected by several types of links, such as fragment-to-fragment links and term-to-fragment links. Fragment-to-fragment links are used to connect two different fragments, for example a topic and a sub-topic. These links represent the logical sequence of the fragments, e.g., the order in which the fragments should be read to be understood. Term-to-fragment links connect a term with a fragment that provides information about the term. An example of term-to-fragment link is a hyperlink that leads to a definition or some other additional information about the term associated with the link. The links may be directed or undirected. The directed links connect a first fragment with a second fragment, but the second fragment does not necessarily contain a link back to the first fragment. The term-to-fragment link is a typical example of a directed link. The undirected links, also referred to as bidirectional links, connect two fragments in both directions. An example of an undirected link might be the fragment-to-fragment link, since usually the sub-topics contain a link to their main topic.

In one embodiment, fragments may have the several properties affecting the linearization process including access rights to control the access of different user groups, and version to monitor the fragment's version. The links and fragments may be augmented with metadata describing specific features that may be used for construction of different linear representations. For example, a user may want to construct a linear representation containing only fragments published by him. So the publisher of a fragment may be part of the metadata associated with the fragment and this metadata may be used as criteria for determining the linearization of fragment. The metadata may also include tags describing the purpose of the fragment or the link, for example 'documentation fragment' or 'link to documentation'. These tags may be used to construct a linear representation containing only fragments having specific tags, for example 'documentation fragment'.

At block 120, a portion of the content based network is selected for linearization. In one embodiment, such sub-networks may be selected according to the purpose of the linearization. Examples of selection strategies are described below with reference to FIGS. 2A, 2B, and 2C. At block 130, the process calculates fragment weights and link weights for fragments and links of the sub-network. The fragment weights are related to the fragment's importance and may be used to determine an order by which the fragments will be assembled to generate the linearized form of the content based network. The link weights are closely related to the fragment weights. They are used to create a hierarchical structure of the sub-network, having only one path of links between each two fragments, as described below with reference to block 140. All fragments of the selected sub-network are included in the hierarchical structure and it does not contain cycling links, because it is later used to order the fragments in a linear representation.

There are various approaches for determining the importance of a fragment. For example, the importance may be related to the amount of information measured for each fragment. In another embodiment, statistical information about the number of visits to each fragment may be used. The higher number of visits to a fragment can be interpreted as an evidence of its higher importance resulting in assigning a higher weight. In yet another embodiment, the importance is determined by the number of links to the fragment. The higher number of links results in higher weight. In yet another embodiment, the users may rate the importance of each fragment by entering values in a designated rating area. Higher values result in higher fragment weight. Customizing fragment weight according user specified keywords is also possible. The higher number of occurrences of the user specified keyword in the fragment could result in higher fragment weight. Link weight is closely related to the weights of the fragments that are connected by the link. In one embodiment, the link weight is the arithmetic average of the weights of the fragments connected by the link.

At block 140, a hierarchical structure is created from the fragments and the links of the sub-network, selected at block 120. The hierarchical structure is based on the weights calculated at block 130. There is a possibility to have cycling links between some fragments in the sub-network. Cycles typically refer to a circular collection of links that start out and end at the same fragment. These cycles should preferably be resolved in order to construct a linear representation. In one embodiment, the cycles are resolved by removing links starting with the lowest weighted links while ensuring that their removal does not leave any fragments isolated from the rest of the sub-network. The process can be repeated with removal of links with higher weights. This process continues until there are no more cycling links or until no more links having the same weight can be removed without leaving fragments isolated from the sub-network. When it is not possible to remove more links having the same weight, each fragment from each remaining cycle is analyzed for the possibility of removing all links with the lowest weight from this fragment. If such removal is possible without leaving fragments isolated from the rest of the sub-network, all links with lowest weight are removed from this fragment. If after this step, there are more cycling links left, they are removed by a procedure, confirming the availability of links between each of the fragments on a first come first served basis. This procedure checks if there is already an existing path between each pair of fragments and removes any additional links between the two fragments.

At block 150, a linear representation is constructed based on the hierarchical structure created at block 140. In one embodiment, the order of the fragments in the linear representation is determined by the fragment or link weights (e.g., fragments with higher weights will appear first in the linear representation). In the linear representation, the links may be replaced by plain text or footnotes depending on the metadata, associated with the links, and the scope of the linearization. If the user does not have access rights to view a certain fragment, the fragment is not included in the linear representation. However, if there is a link from the disallowed fragment to other fragment, which the user is allowed to view, only the contents of the disallowed fragment are removed. In one embodiment, the removed contents are replaced in the linear representation by a footnote with a remark to the linked fragment. The fragments can be included in the linear representation either dynamically or statically. The dynamically included fragments remain linked to the original fragments of the content based network. Any change of these fragments in the linear representation will affect the content based network and vice versa. The statically included fragments are copies of the original fragments of the content based network and changes to them will not affect the originals. The linear representation is enriched with automatically generated page numbers, table of contents and index entries linked to the page numbers, and glossary fragments.

The glossary fragments can be based on the glossary entries available for each fragment included in the linear representation fragment. According to one embodiment, the glossary entries are generated depending on the fact that the user has access rights for the fragment from which the entry is generated. In one embodiment, it is possible to allow weaker access rights allowing the fragment to be replaced by the glossary entry if the fragment is not accessible.

Figure 2A:
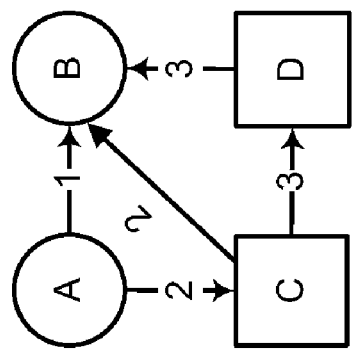
FIG. 2A is a block diagram illustrating an example of a bipolar strategy for selecting a sub-network of a content based network for linearization, in accordance with an embodiment of the present invention.

FIG. 2A is an example of bipolar strategy for selecting a sub-network for linearization (e.g., as in block 120 of FIG. 1). This strategy defines a start fragment A and a final fragment B in a content based network 200. Once the start and the final fragments are selected all paths from the start to the final fragment are found. Shorter paths between nodes A and B have a higher priority. The direct path 1 between A and B has priority 1, path 2 through the intermediate fragment C has priority 2, and path 3 through fragments C and D has priority 3. The priority determines how many fragments will be included in the linear representation. The thoroughness of the linear representation depends on the priority, chosen by the user. In this example, if the chosen priority is 1 only fragments A and B will be included in the sub-network. If the chosen priority is 2, fragments A, C, and B will be included, and if the chosen priority is 3, fragments A, C, D, and B will be included.

Figure 2B:
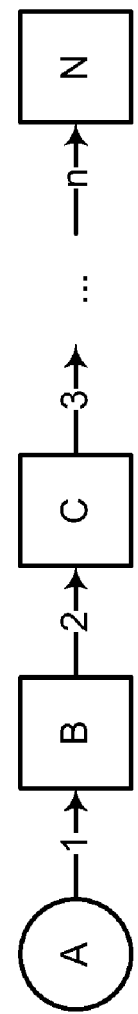
FIG. 2B is a block diagram illustrating an example of a monopolar strategy for selecting a sub-network of a content based network for linearization, in accordance with an embodiment of the present invention.

FIG. 2B is an example of a monopolar strategy for selecting a sub-network for linearization. This strategy defines only a start fragment A. The depth of the links from the start fragment to other related fragments is a parameter that is customizable by the user. According to the depth, the strategy finds all paths of the content based network, extending from the selected fragment A up to the desired depth and includes in the sub-network all fragments of such paths. The depth determines how many fragments will be included in the linear representation. In this example, if the chosen depth is 1 only fragments A and B will be included. If the depth is 2, fragments A, B, and C will be included, etc.

Figure 2C:
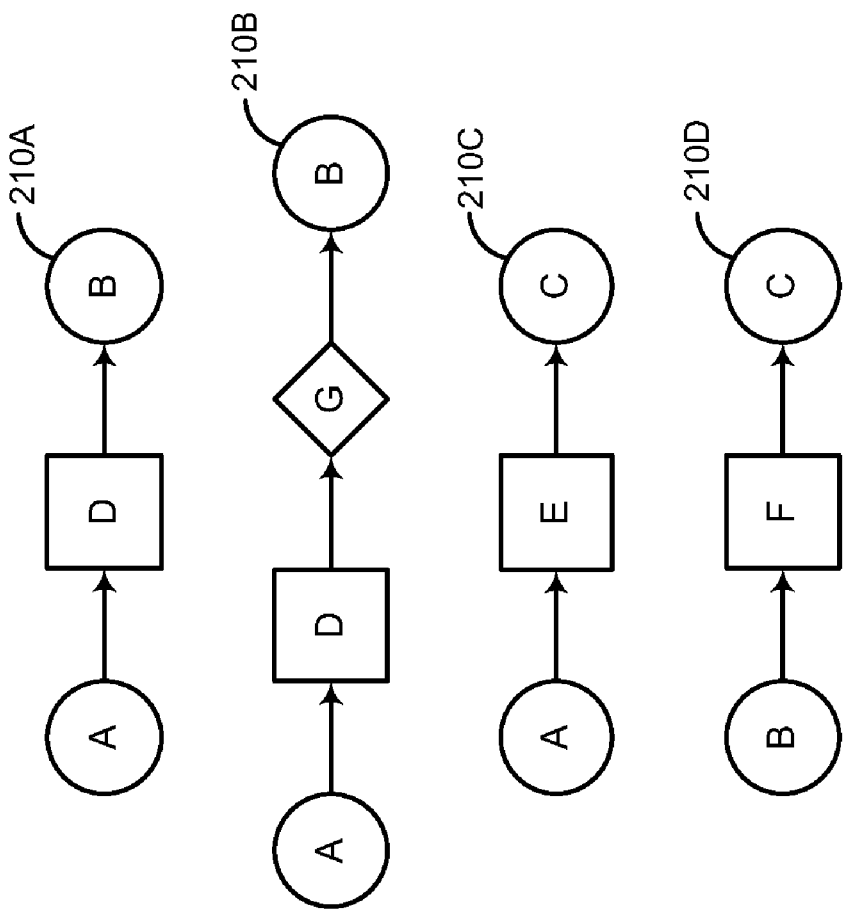
FIG. 2C is a block diagram illustrating an example of a multipolar strategy for selecting a sub-network of a content based network for linearization, in accordance with an embodiment of the present invention.

FIG. 2C is an example of multipolar strategy for selecting a sub-network for linearization. This strategy defines a set of core fragments A, B, and C that are part of content based network. The strategy finds all paths (210a, 210b, 210c and 210d) between the core fragments. The level of detail is a customizable parameter that determines how many fragments will be included in the linear representation. If the level of detail is 1, only one fragment for each path between the core fragments will be included. In this example, if the level of detail is 1, fragments D, E, and F will be included along with the core fragments. If the level of detail is 2, fragment G will be included along with the rest fragments. A higher level of detail results in a larger number of fragments included in the linear representation.

Figure 3A:
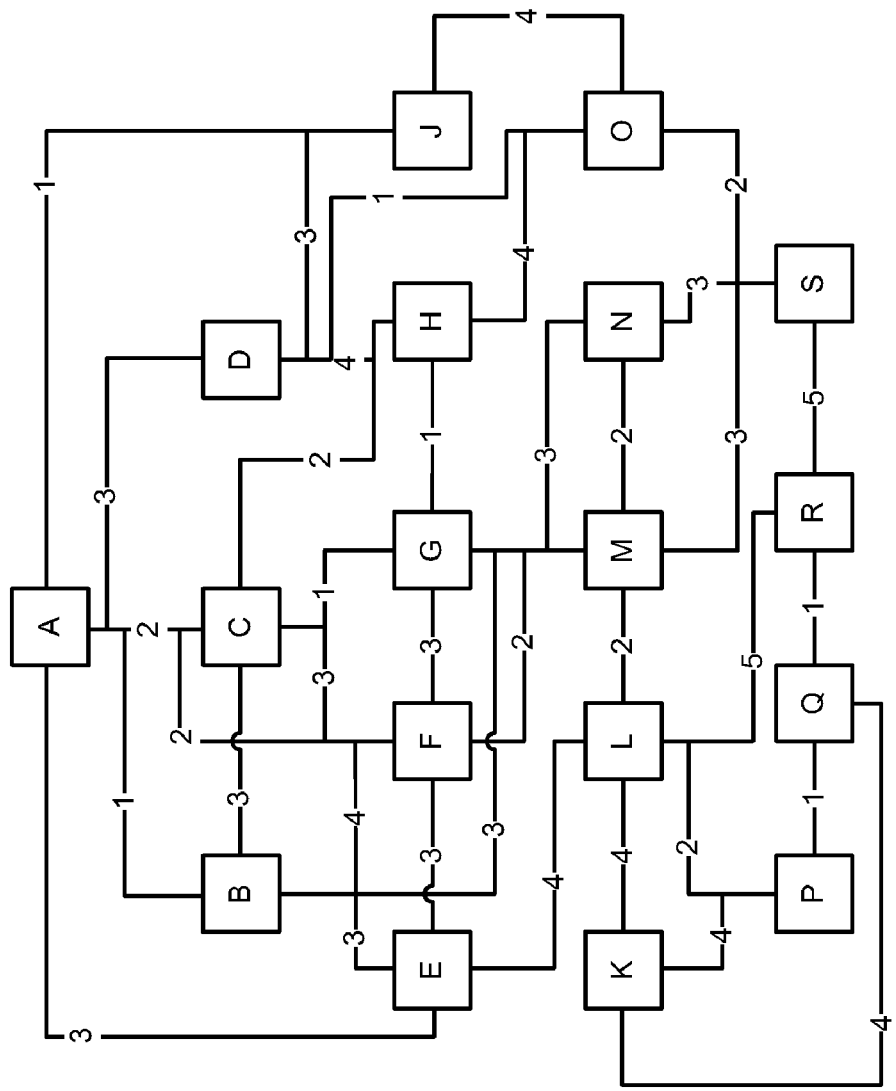
FIG. 3A is a block diagram illustrating an example of a sub-network of a content based network having a set of fragments connected by a set of undirected links with assigned weights, in accordance with an embodiment of the present invention.

FIG. 3A is an example of a sub-network of a content based network having a set of fragments connected by a set of undirected links with assigned weights. In this example, the sub-network has 18 fragments, named with consecutive capital letters from 'A' to 'S'. The process of generating a linearization of the sub-network is described with reference to FIGS. 3B-E. The sub-network in FIG. 3A is shown with undirected links having five predefined weights designated with consecutive numbers from '1' to '5'. Lower numbers designate lower weights. The sub-network of FIG. 3A has cycling links, therefore it cannot be converted to a linear representation. The process of resolving cycling links described in reference to FIG. 1 above should be applied. In this example, the process of resolving cycling links starts by removing all links with weight equal to '1', as described with reference to FIG. 3B below.

Figure 3B:
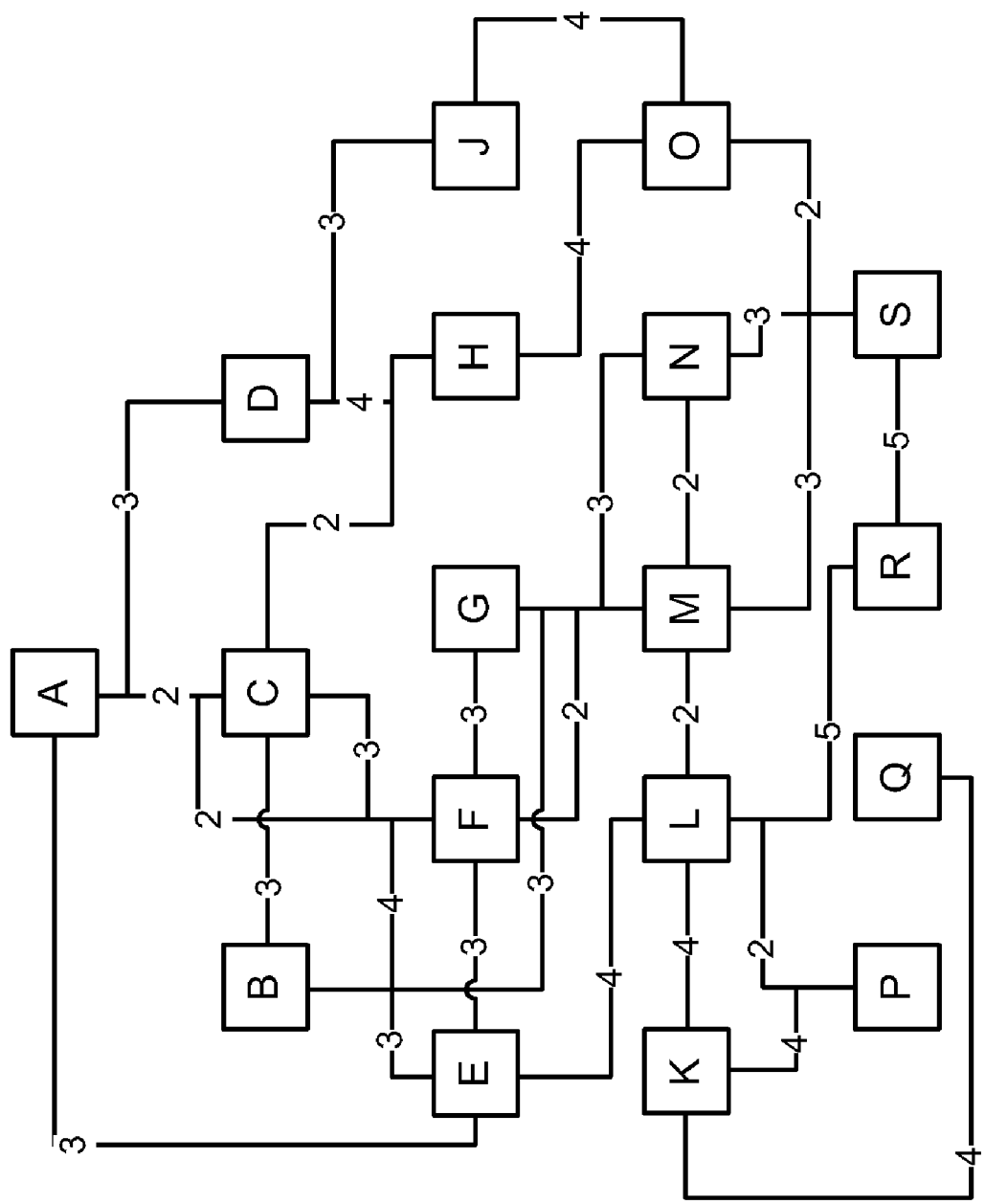
FIG. 3B is a block diagram illustrating an example of a first step of creating a hierarchical structure of the sub-network shown on FIG. 3A, in accordance with an embodiment of the present invention.

FIG. 3B is an example of a first step of creating a hierarchical structure of the sub-network shown on FIG. 3A. The process of resolving cycling links starts by removing all links with lowest link weight, in this example link weight equal to '1'. The removal of all links with link weight equal to '1' does not create any isolated fragments. The result, however, is not a hierarchical structure, because there are still some cycles present, such as 'A'-'E'-'F'-'A', 'A'-'C'-'H'-'D'-'A', etc. The process of resolving cycling links continues by removing all links with weight equal to '2', as described with reference to FIG. 3C below.

Figure 3C:
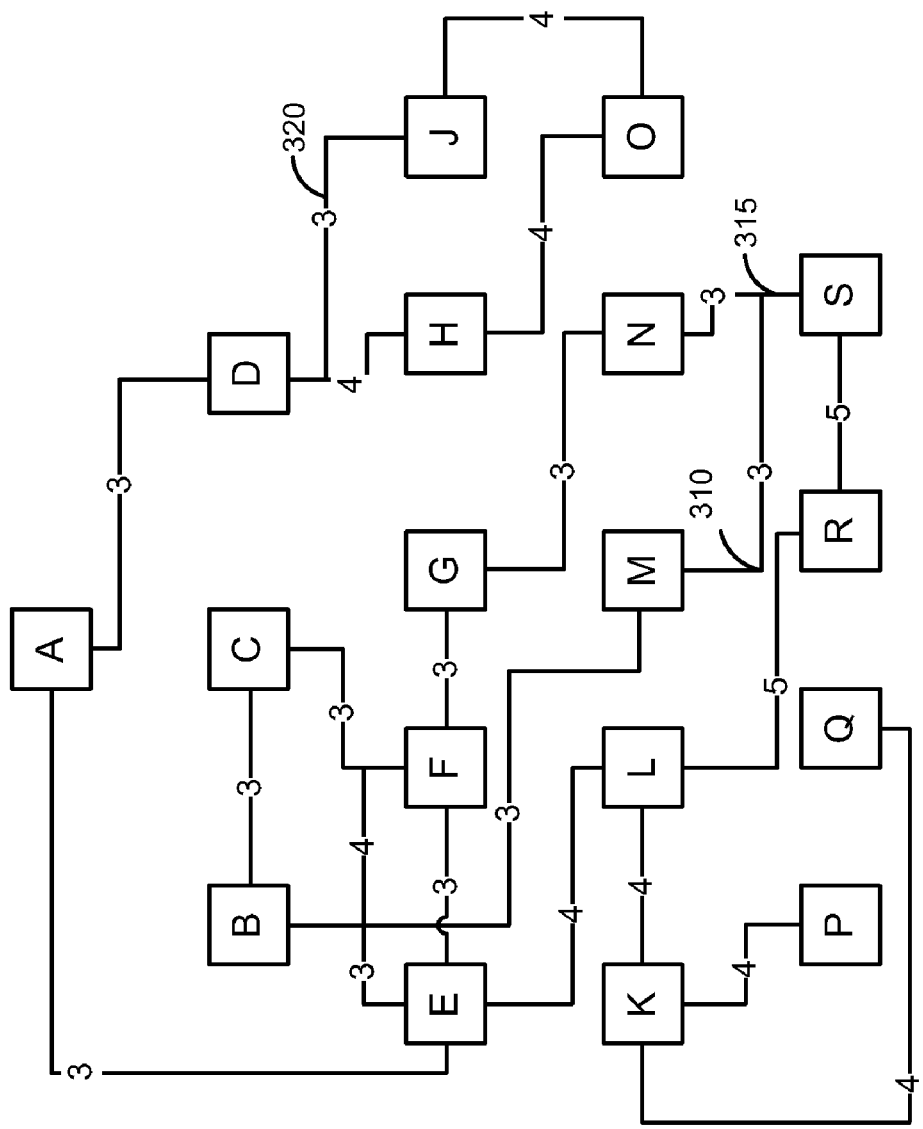
FIG. 3C is a block diagram illustrating an example of a second step of creating a hierarchical structure of the sub-network shown on FIG. 3A, in accordance with an embodiment of the present invention.

FIG. 3C is an example of a second step of creating a hierarchical structure of the sub-network shown on FIG. 3A. The process continues by removing all links with link weight equal to '2'. The removal of all links with link weight equal to '2' does not create any isolated fragments. However, the result is still not a hierarchical structure, because there are still some cycles present, such as 'D'-'H'-'O'-'J'-'D', 'B'-'C'-'F'-'G'-'N'-'S'-'M'-'B', etc. If the process continues by removing all links with link weight equal to '3', the following fragments will become isolated from the sub-network: 'A', 'C', 'G', 'M', and 'N'. Therefore, the process continues by analyzing each fragment from each cycle for the possibility of removing links with link weight equal to '3' from the fragment without leaving isolated fragments. Two such fragments are found at 'J' and 'S' and the links 310, 315 and 320 are removed. The result is shown on FIG. 3D.

Figure 3D:
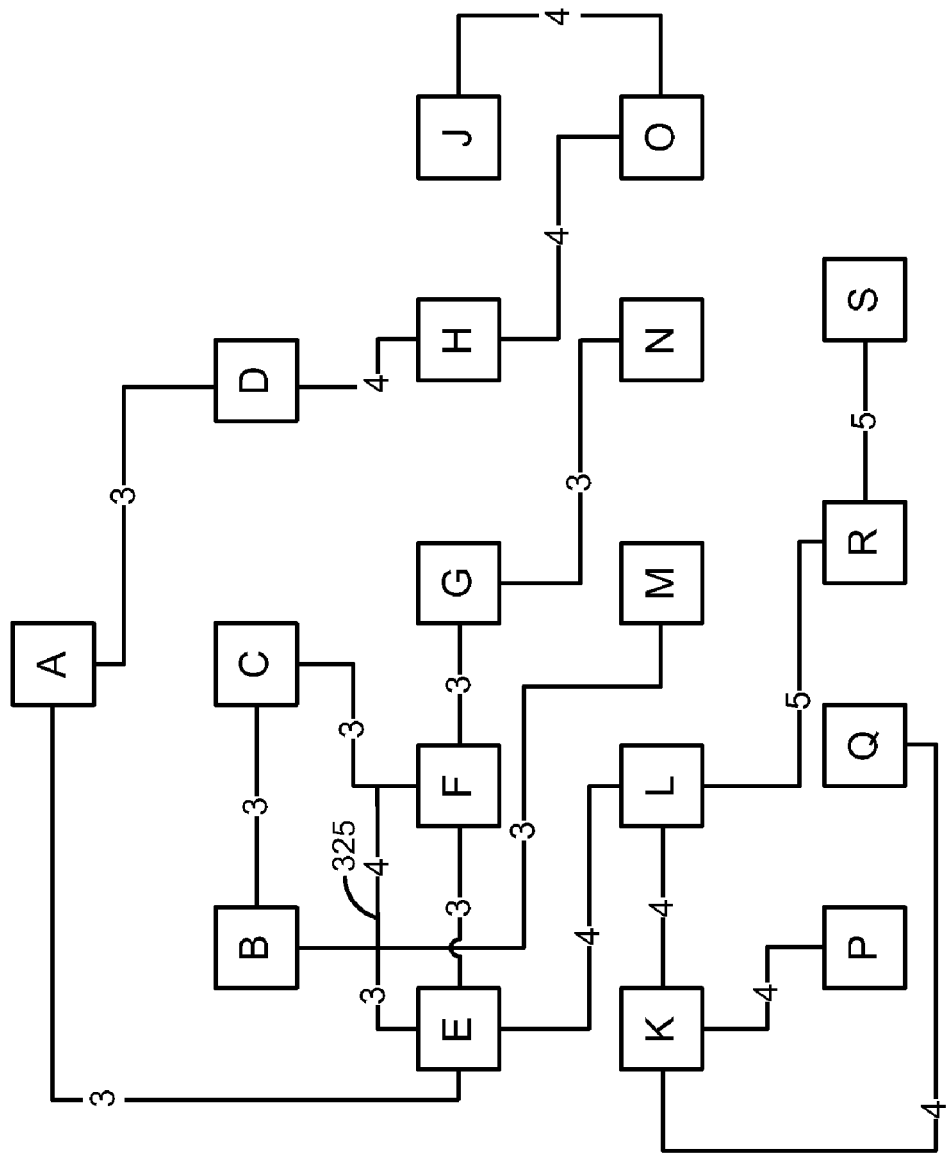
FIG. 3D is a block diagram illustrating an example of a third step of creating a hierarchical structure of the sub-network shown on FIG. 3A, in accordance with an embodiment of the present invention.

FIG. 3D is an example of a third step of creating a hierarchical structure of the sub-network shown on FIG. 3A. There are two more cycles remaining after the steps applied in FIG. 3B and FIG. 3C: 'B'-'C'-'F'-'B' and 'B'-'E'-'F'-'B'. The process continues by validating the remaining links. In this example, the starting fragment is 'A'. The first level of the hierarchy structure is formed by the 'A'-'D' and 'A'-'E' links. Starting from fragments 'D' and 'E', the second level of the hierarchy structure is formed by 'D'-'H', 'E'-'B', 'E'-'F', and 'E'-'L' links. Since fragments 'B' and 'F' are already connected via links 'E'-'B' and 'E'-'F', the link 'B'-'F' at 325 is removed. Starting from fragments 'H', 'B', 'F', and 'L', the third level of the hierarchy structure is formed by the links 'H'-'O', 'B'-'C', 'B'-'M', 'F'-'G', 'L'-'K', and 'L'-'R'. The link 'F'-'C' is equivalent to the link 'B'-'C' and since the link 'B'-'C' was validated first, the link 'F'-'C' is removed. By removing links 'B'-'F' and 'F'-'C' the last two cycles are resolved. The result is shown on FIG. 3E.

Figure 3E:
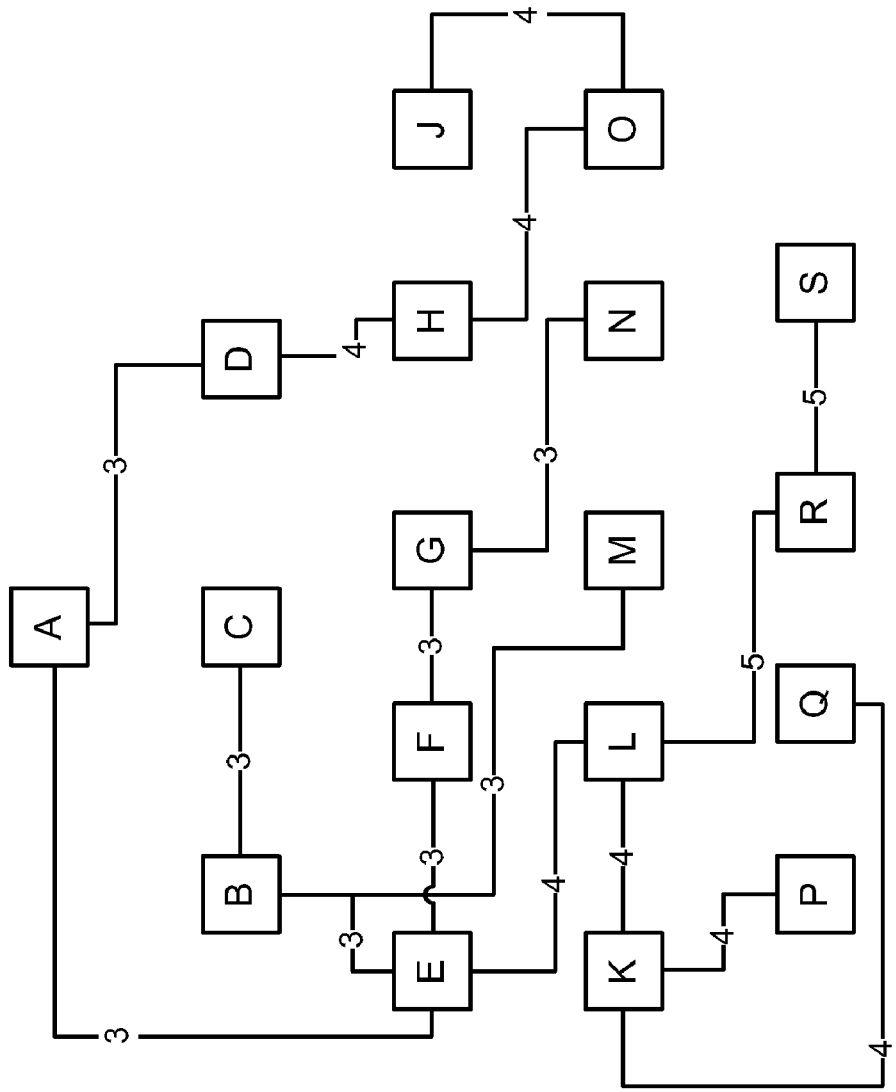
FIG. 3E is a block diagram illustrating an example of a hierarchical structure created from the sub-network shown on FIG. 3A, in accordance with an embodiment of the present invention.

FIG. 3E is an example of a hierarchical structure created from the sub-network shown on FIG. 3A. After applying the steps from FIG. 3B, FIG. 3C, and FIG. 3D, the result is a hierarchical structure that does not contain cycling links and ready to be converted to a linear representation. In one embodiment, the linear representation of this hierarchical structure may be constructed by enumerating the hierarchical structure and including fragments with higher weights first.

Figure 4A:
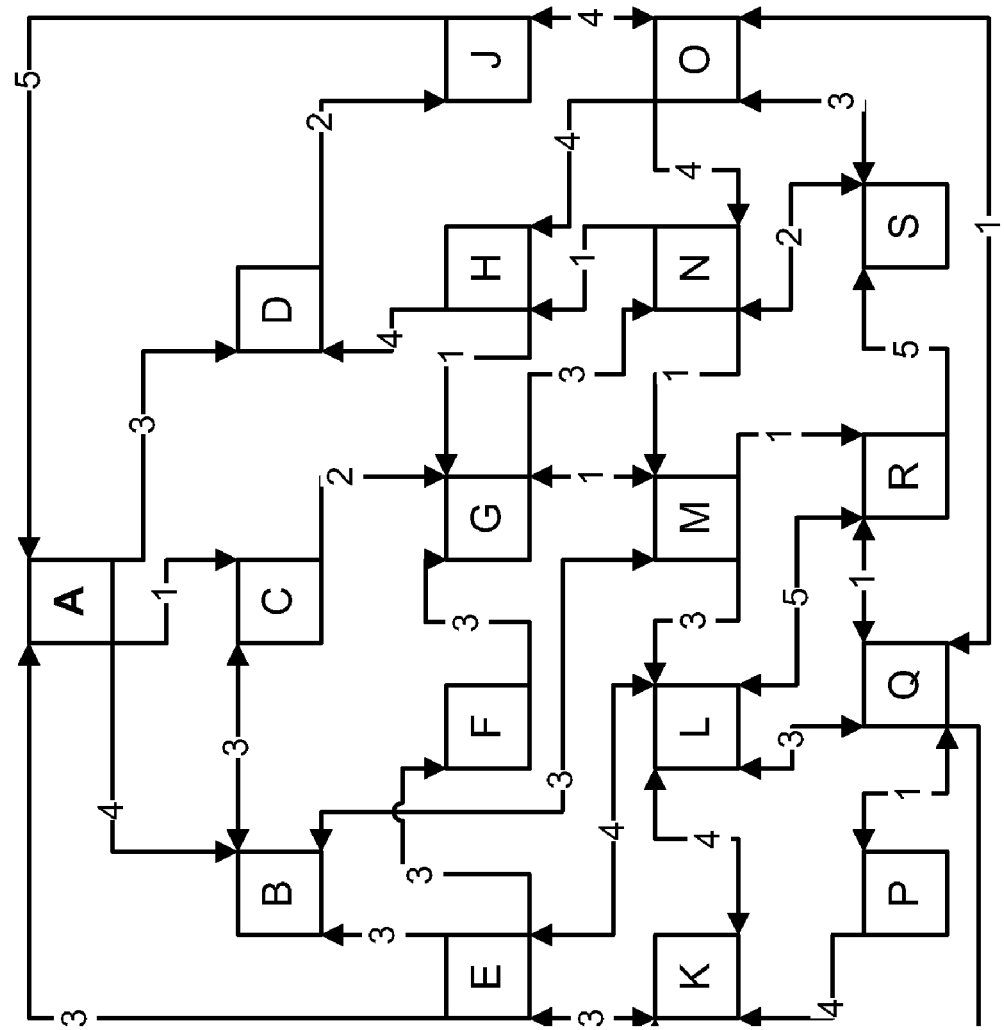
FIG. 4A is a block diagram illustrating an example of a sub-network of a content based network having a set of fragments connected by a set of directed links with assigned weights, in accordance with an embodiment of the present invention.

FIG. 4A is a block diagram illustrating an example of a sub-network of a content based network having a set of fragments connected by a set of directed links with assigned weights. Like the example shown on FIG. 3A, the sub-network has 18 fragments, named with consecutive capital letters from 'A' to 'S'. The process of generating a linearization of the sub-network containing directed links is described with reference to FIGS. 4B-F. The sub-network in FIG. 4A is shown with directed links having five predefined weights designated with consecutive numbers from '1' to '5'. Lower numbers designate lower weights. The sub-network of FIG. 4A has cycling directed links, therefore it cannot be converted to a linear representation. The process of resolving cycling directed links differs from the process described in reference to FIG. 3 above. The process of resolving cycling directed links requires a starting fragment. In this example, the starting fragment is fragment 'A'.

Figure 4B:
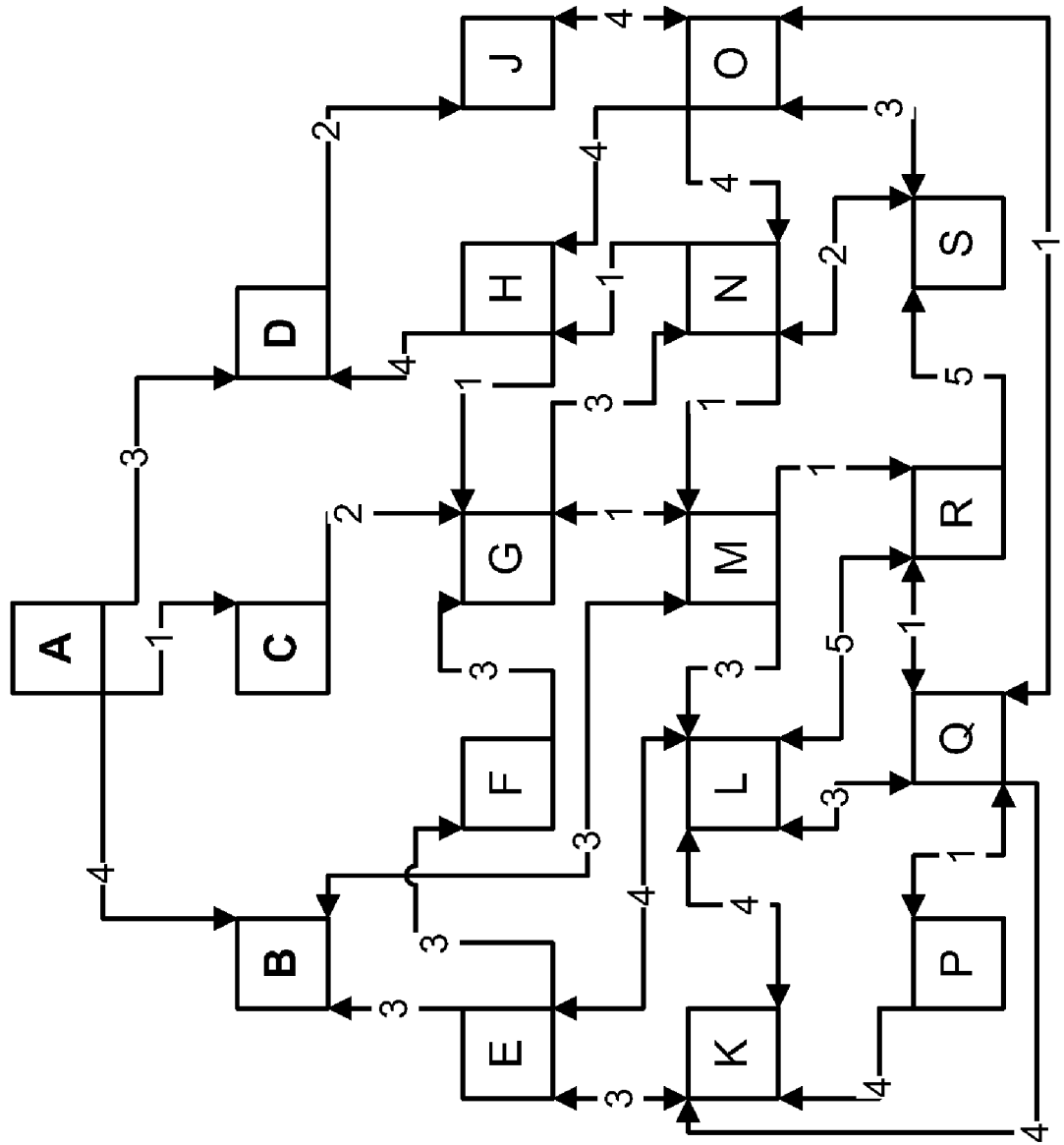
FIG. 4B is a block diagram illustrating an example of a first step of creating a hierarchical structure of the sub-network shown on FIG. 4A, in accordance with an embodiment of the present invention.

FIG. 4B is a block diagram illustrating an example of a first step of creating a hierarchical structure of the sub-network shown on FIG. 4A. The process of resolving cycling directed links starts by removing all directed links to the starting fragment 'A'. The starting fragment 'A' has directed links to fragments 'B', 'C', and 'D'. These fragments form the first level of the hierarchical structure. The link between the fragments 'B' and 'C' is removed, since these fragments are already connected through fragment 'A'.

Figure 4C:
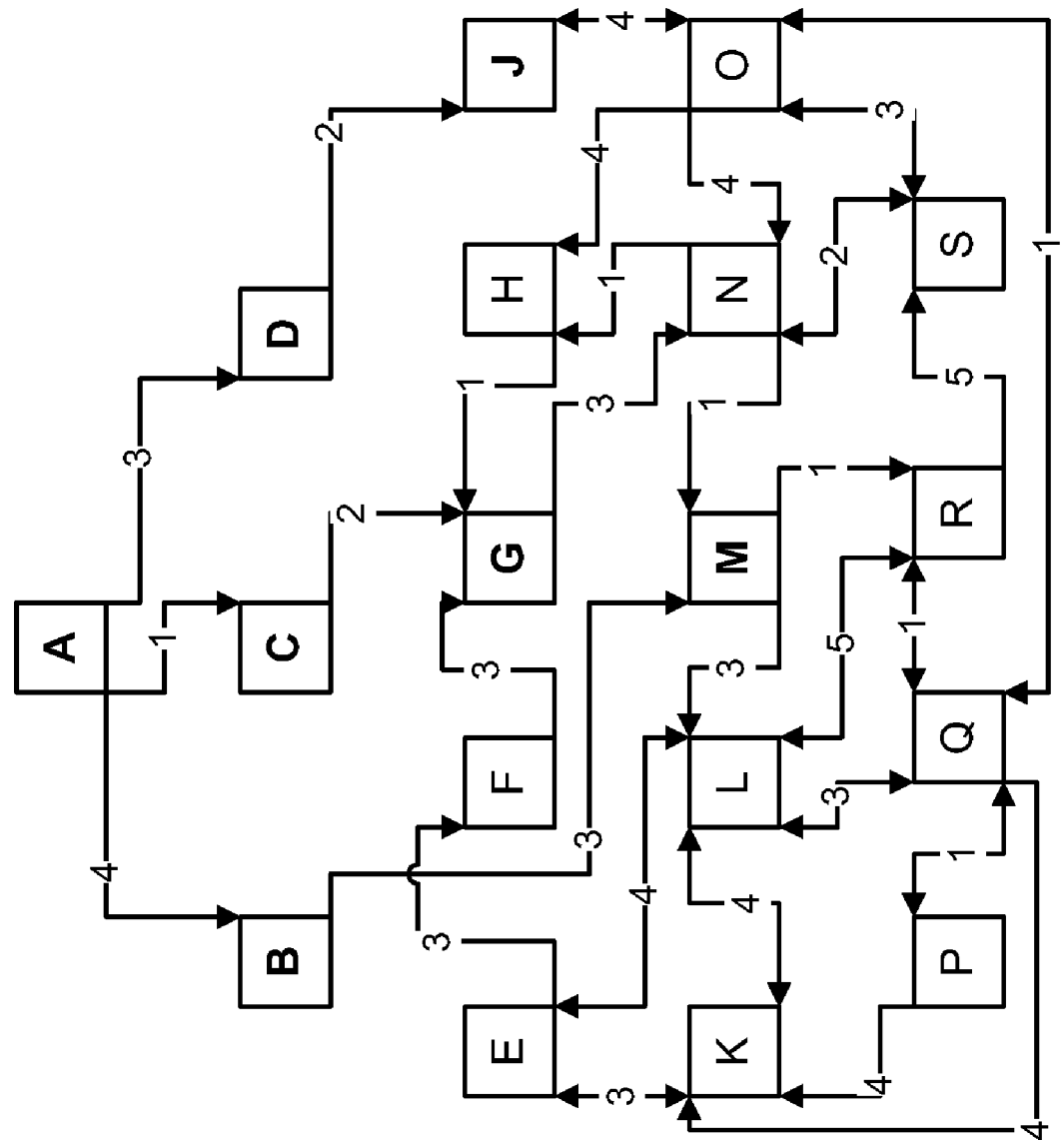
FIG. 4C is a block diagram illustrating an example of a second step of creating a hierarchical structure of the sub-network shown on FIG. 4A, in accordance with an embodiment of the present invention.

FIG. 4C is a block diagram illustrating an example of a second step of creating a hierarchical structure of the sub-network shown on FIG. 4A. The process continues by removing all directed links to the fragments added on the first step, described in reference to FIG. 4B above. Fragment 'B' has a directed link to fragment 'M', fragment 'C' has a directed link to fragment 'G', and fragment 'D' has a directed link to fragment 'J', therefore fragments 'M', 'G', and 'J' form the second level of the hierarchical structure. Since fragments 'M' and 'G' are already connected through the existing levels of the hierarchical structure, the direct link between them is removed.

Figure 4D:
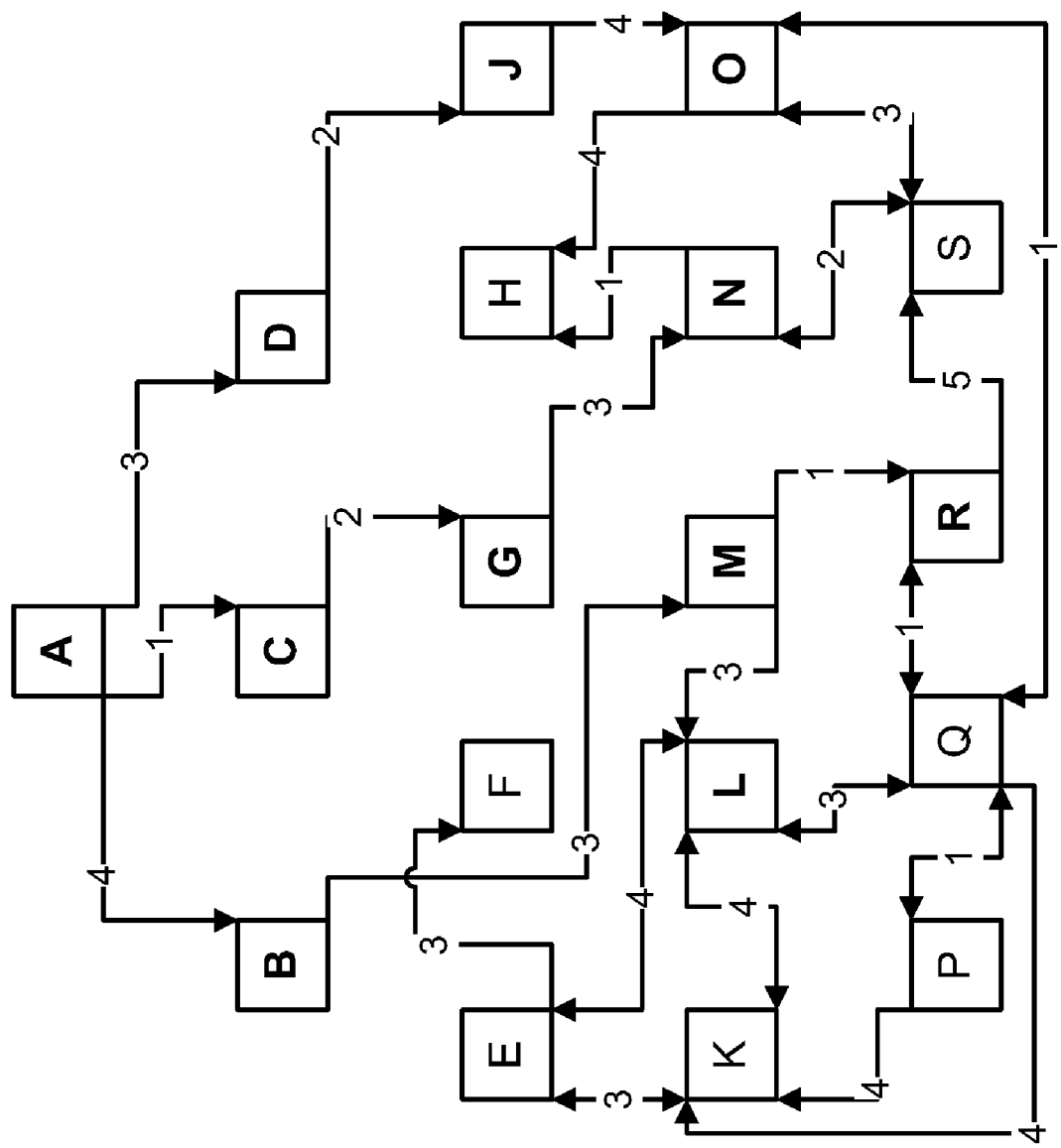
FIG. 4D is a block diagram illustrating an example of a third step of creating a hierarchical structure of the sub-network shown on FIG. 4A, in accordance with an embodiment of the present invention.

FIG. 4D is a block diagram illustrating an example of a third step of creating a hierarchical structure of the sub-network shown on FIG. 4A. The process continues by removing all directed links to the fragments added on the second step, described in reference to FIG. 4C above. Fragment 'M' has directed links to fragments 'L' and 'R', fragment 'G' has a directed link to fragment 'N', and fragment 'J' has a directed link to fragment 'O', therefore fragments 'L', 'R', 'N' and 'O' form the third level of the hierarchical structure. Since fragments 'L' and 'R' as well as 'N' and 'O' are already connected through the existing levels of the hierarchical structure, the direct links between them are removed.

Figure 4E:
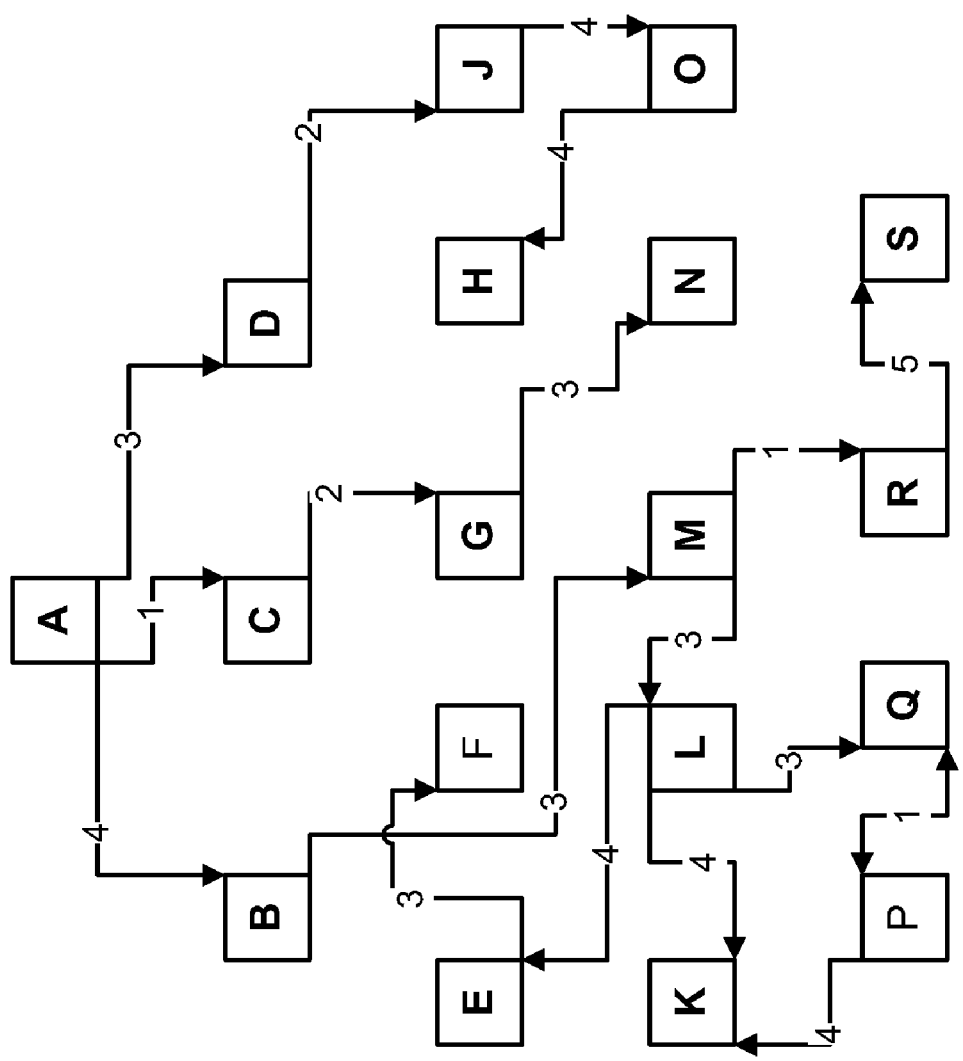
FIG. 4E is a block diagram illustrating an example of a fourth step of creating a hierarchical structure of the sub-network shown on FIG. 4A, in accordance with an embodiment of the present invention.

FIG. 4E is a block diagram illustrating an example of a fourth step of creating a hierarchical structure of the sub-network shown on FIG. 4A. The process continues by removing all directed links to the fragments added on the third step, described in reference to FIG. 4D above. Fragment 'Q' is both linked by fragments 'L' and 'R'. The process keeps the link between fragments 'L' and 'Q', since it has the highest weight and removes the link between 'R' and 'Q'. Fragment 'S' is linked by fragments 'R', 'N', and 'O'. The process keeps the link between fragments 'R' and 'S', since it has the highest weight and removes the other links. Fragment 'H' is both linked by fragments 'N' and 'O'. The process keeps the link between fragments 'O' and 'H', since it has the highest weight and removes the link between 'N' and 'H'. Fragment 'L' has directed links to fragments 'E' and 'K'. Therefore, fragments 'E', 'K', 'Q', 'S', and 'H' form the fourth level of the hierarchical structure. The direct links between fragments 'E' and 'K' as well as 'K' and 'Q' are removed, since these fragments are already connected through the existing levels of the hierarchical structure.

Figure 4F:
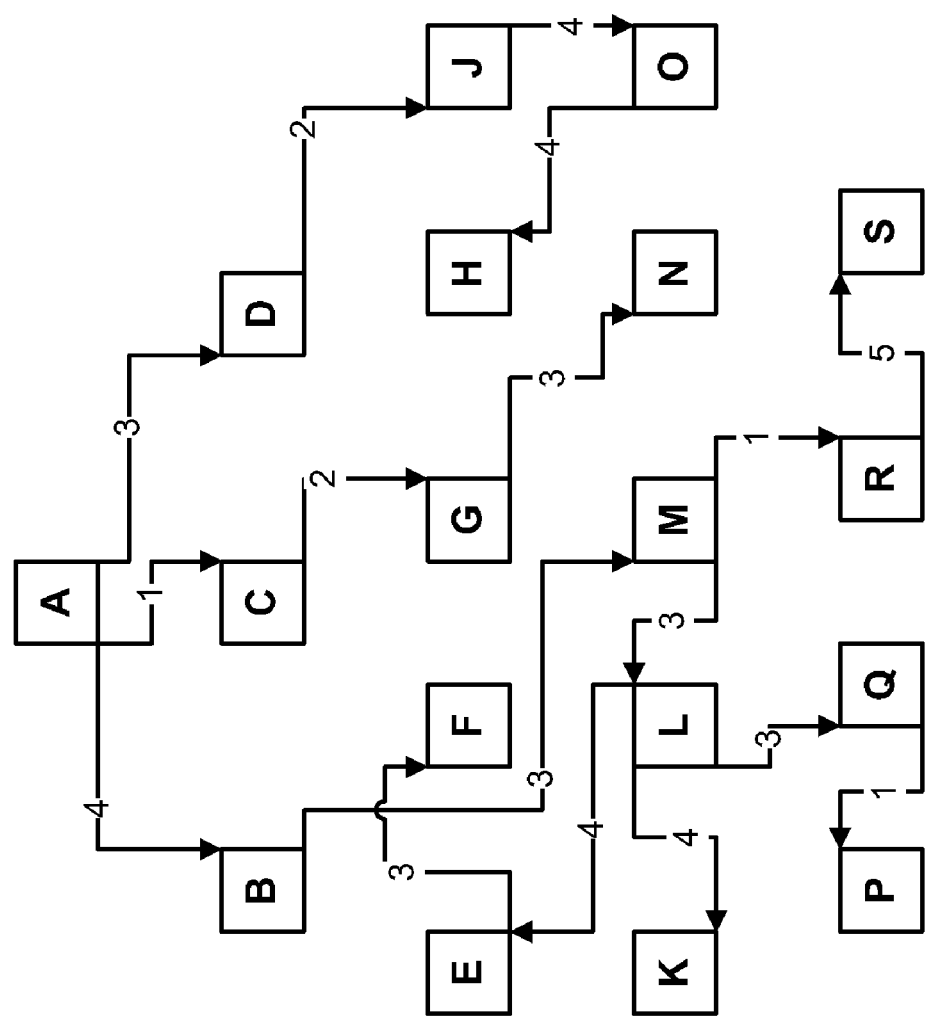
FIG. 4F is a block diagram illustrating an example of a hierarchical structure created from the sub-network shown on FIG. 4A, in accordance with an embodiment of the present invention.

FIG. 4F is a block diagram illustrating an example of a hierarchical structure created from the sub-network shown on FIG. 4A. The process continues by removing all directed links to the fragments added on the fourth step, described in reference to FIG. 4E above. The process finishes by adding fragments 'F' and 'P' as the last level of the hierarchy, since fragment 'E' has a directed link to fragment 'F' and fragment 'Q' has a directed link to fragment 'P'. The result is a hierarchical structure that does not contain cycling links and ready to be converted to a linear representation.

Some example embodiments of the invention may include the above-illustrated modules and methods being written as one or more software components. These components, and the functionality associated with each, may be used by client, server, or peer computer systems. These components may be written in any computer programming languages including object-oriented computer languages such as C++, and Java. The functionality described herein may be distributed among different components and may be linked to each other via application programming interfaces and compiled into one complete server and/or client application. Furthermore, these components may be linked together via distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or other configurations.

Software components described above are tangibly stored on a machine readable medium including a computer readable medium. The term "computer readable medium" should be taken to include a single medium or multiple media that stores one or more sets of instructions. The term "computer readable medium" should also be taken to include medium that is capable of tangibly storing or encoding instructions for execution by a computer system and that causes the computer system to perform any of the methods described herein.

Figure 5:
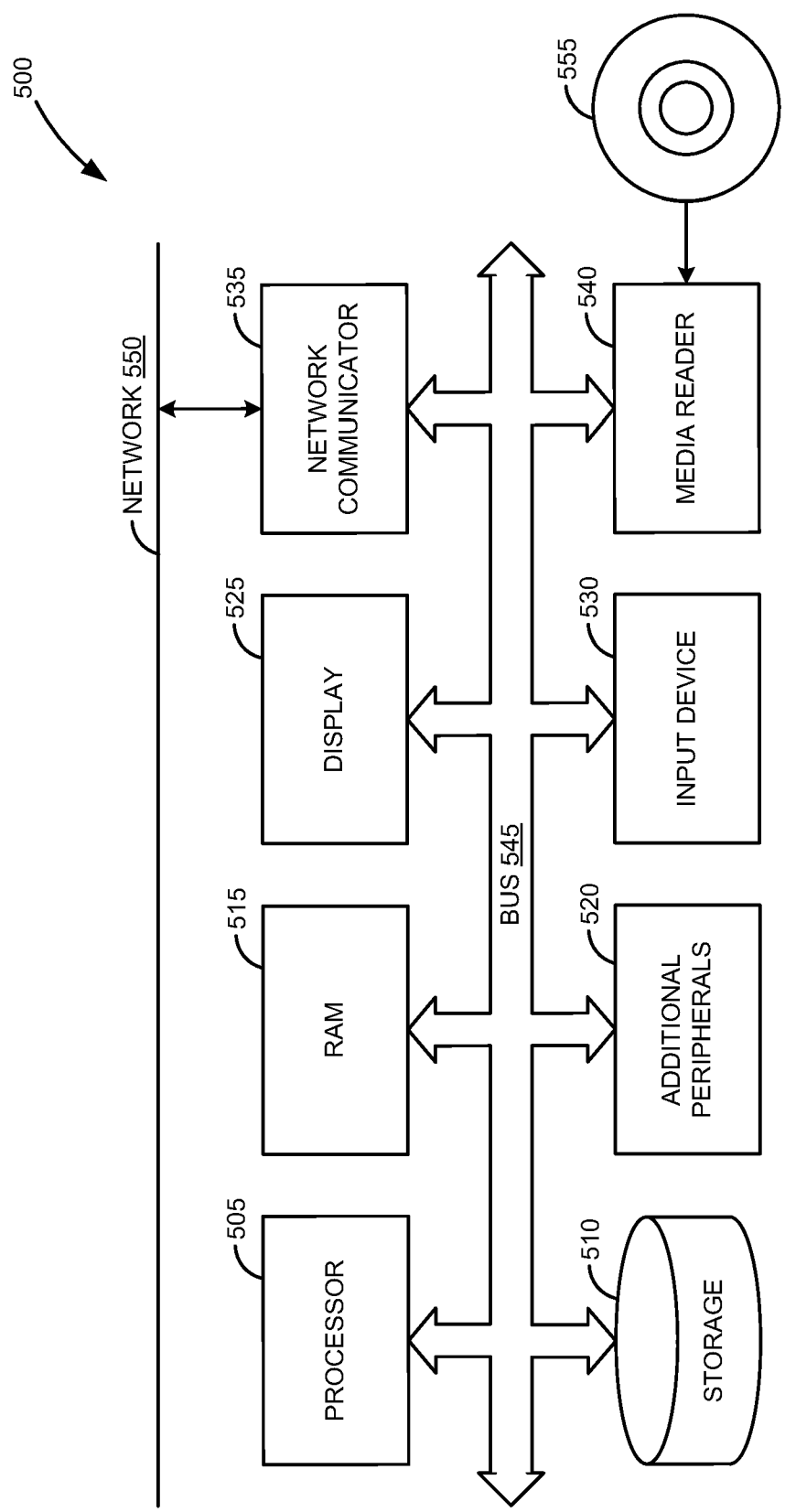
FIG. 5 is a block diagram of an exemplary computer system, in accordance with an embodiment of the present invention.

FIG. 5 is a block diagram of an exemplary computer system 500. The computer system 500 includes a processor 505 that executes programming code tangibly stored on a computer readable medium 555 to perform the methods of the invention described herein. The computer system 500 includes a media reader 540 to read the programming code from the computer readable medium 555 and store the code in storage 510 or in random access memory (RAM) 515. The storage 510 provides a large space for keeping static data where the programming code could be stored for later execution. From the programming code, a series of instructions are generated and dynamically stored in the RAM 515. The processor 505 reads instructions from the RAM 515 and performs actions as instructed. According to one embodiment of the invention, the computer system 500 further includes a display 525 to provide visual information to users, an input device 530 to provide a user with means for entering data and interfere with computer system 500, one or more additional peripherals 520 to further expand the capabilities of the computer system 500, and a network communicator 535 to connect the computer system 500 to a network 550. The components of the computer system 500 are interconnected via a bus 545.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A computer readable medium having a set of computer readable instructions tangibly stored therein, which when executed by the computer, cause the computer to perform a set of operations for constructing linear representation of content based network, the operations comprising:
   receiving a sub-network of a content based network comprising a plurality of fragments connected by one or more links;
   calculating fragment weight for at least some of the plurality of fragments;
   calculating link weight for at least one of the one or more links;
   creating a hierarchical structure from the sub-network, based on at least some of the calculated fragment weights and at least some of the calculated link weights, wherein creating the hierarchical structure comprises iteratively removing cycling links between two or more fragments of the plurality of fragments in the sub-network provided that each of the two or more fragments are connected by at least one link to the sub-network; and
   converting the hierarchical structure to a linear representation.

2. The computer readable medium of claim 1, wherein receiving the sub-network of content based network comprises selecting at least some of the plurality of fragments connected by the one or more links based on a predefined level of detail.

3. The computer readable medium of claim 1, wherein calculating the fragment weight for the at least some of the plurality of fragments comprises determining an importance of the at least some of the plurality of fragments.

4. The computer readable medium of claim 3, wherein determining the importance of the at least some of the plurality of fragments comprises:
   measuring the amount of information disclosed by the at least some of the plurality of fragments;
   collecting statistical information about the number of visits of the at least some of the plurality of fragments; and
   collecting user input, evaluating the importance the at least some of the plurality of fragments.

5. The computer readable medium of claim 1, wherein calculating link weight for at least one of the one or more links comprises:
   acquiring the fragment weight of two fragments, connected by a link of the one or more links; and
   for at least one of the one or more links, applying a predefined function of the fragment weight of the two fragments, connected by the link.

6. The computer readable medium of claim 1, wherein creating the hierarchical structure from the sub-network further comprises:
   verifying for uniqueness of the path between at least some of the plurality of fragments.

7. The computer readable medium of claim 1, wherein converting the hierarchical structure to a linear representation comprises:
   including at least some of the plurality of fragments according to the corresponding fragment weight; and
   replacing at least one of the one or more links in the hierarchical structure with a corresponding fragment.

8. The computer readable medium of claim 1 further comprises:
   generating page numbers for the linear representation;
   adding table of contents in the linear representation; and
   including a glossary fragment to the linear representation, based on glossary entries available for at least some of the plurality of fragments.

9. The computer readable medium of claim 1 further comprises dynamically including at least some of the plurality of fragments into the linear representation.

10. A computerized method for constructing linear representation of content based network, comprising:
    receiving a sub-network of a content based network comprising a plurality of fragments connected by one or more links;
    calculating fragment weight for at least some of the plurality of fragments;
    calculating link weight for at least one of the one or more links;
    creating a hierarchical structure from the sub-network, based on at least some of the calculated fragment weights and at least some of the calculated link weights, wherein creating the hierarchical structure comprises resolving cycling links between two or more fragments of the plurality of fragments in the sub-network; and
    converting the hierarchical structure to a linear representation.

11. The method of claim 10, wherein receiving the sub-network of content based network comprises selecting at least some of the plurality of fragments connected by the one or more links based on a predefined level of detail.

12. The method of claim 10, wherein calculating the fragment weight for the at least some of the plurality of fragments comprises determining an importance of the at least some of the plurality of fragments.

13. The method of claim 12, wherein determining the importance of the at least some of the plurality of fragments comprises:
    measuring the amount of information disclosed by the at least some of the plurality of fragments;
    collecting statistical information about the number of visits of the at least some of the plurality of fragments; and
    collecting user input, evaluating the importance of the at least some of the plurality of fragments.

14. The method of claim 10, wherein calculating link weight for at least one of the one or more links comprises:
    acquiring the fragment weight of two fragments, connected by a link of the one or more links; and
    for at least one of the one or more links, applying a predefined function of the fragment weight of the two fragments, connected by the link.

15. The method of claim 10, wherein resolving cycling links comprises:
    reducing the one or more links of the sub-network by removing the one or more cycling links between two or more fragments of the plurality of fragments in the sub-network, according to predefined rules; and
    verifying the reduced one or more links for uniqueness of the path between at least some of the plurality of fragments.

16. The method of claim 10, wherein converting the hierarchical structure to a linear representation comprises:
    including at least some of the plurality of fragments according to the corresponding fragment weight; and replacing at least one of the one or more links in the hierarchical structure with a corresponding fragment.

17. The method of claim 10 further comprises:

generating page numbers for the linear representation;

adding table of contents in the linear representation; and including a glossary fragment to the linear representation, based on glossary entries available for at least some of the plurality of fragments.

18. The method of claim 10 further comprises dynamically including at least some of the plurality of fragments into the linear representation.

19. A computer system including a processor and a memory, the memory comprising instructions that are executable by the processor, the instructions being operable for:

receiving a sub-network of a content based network comprising a plurality of fragments connected by one or more links;

calculating fragment weight for at least some of the plurality of fragments;

calculating link weight for at least one of the one or more links;

creating a hierarchical structure from the sub-network, based on at least some of the calculated fragment weights and at least some of the calculated link weights, wherein creating the hierarchical structure comprises removing cycling links between two or more fragments of the plurality of fragments in the sub-network; and converting the hierarchical structure to a linear representation.

* * * * *